(12) United States Patent
Pichnarcik

(10) Patent No.: US 9,486,383 B1
(45) Date of Patent: *Nov. 8, 2016

(54) SYSTEMS AND METHODS FOR EXERCISING MUSCLES THAT MOVE THE THIGH

(71) Applicant: Kathy Pichnarcik, Scottsdale, AZ (US)

(72) Inventor: Kathy Pichnarcik, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/153,074

(22) Filed: Jan. 12, 2014

(51) Int. Cl.
*A61H 3/00* (2006.01)

(52) U.S. Cl.
CPC ..................... *A61H 3/00* (2013.01)

(58) Field of Classification Search
CPC ............... A61H 2201/1633; A61H 3/008; A61H 2201/1261
USPC ............... 135/66, 67; 482/79, 121, 129, 130
See application file for complete search history.

(56) References Cited

U.S. PATENT DOCUMENTS

| | | | |
|---|---|---|---|
| 781,683 A | 2/1905 | Shepherd | |
| 1,475,442 A | 11/1923 | Manger | |
| 2,109,188 A | 2/1938 | Bajanova | |
| 2,282,689 A | 5/1942 | Ames | |
| 3,532,356 A * | 10/1970 | Lillibridge | A47D 13/04 248/431 |
| 3,778,052 A | 12/1973 | Andow | |
| 3,993,349 A | 11/1976 | Neufeld | |
| 4,025,083 A | 5/1977 | Saint | |
| 4,239,135 A | 12/1980 | Armstrong | |
| 4,415,198 A * | 11/1983 | Brearley | 297/6 |
| 4,532,948 A * | 8/1985 | Burrows | 135/67 |
| 4,621,804 A * | 11/1986 | Mueller | 280/87.041 |
| 4,796,903 A | 1/1989 | Proctor | |
| 4,833,730 A | 5/1989 | Nelson | |
| 4,867,188 A | 9/1989 | Reid | |
| 4,941,497 A | 7/1990 | Prather | |
| 4,974,620 A * | 12/1990 | Quillan et al. | 135/67 |
| 5,050,862 A | 9/1991 | Saghafi | |
| 5,224,721 A | 7/1993 | Santmann | |
| 5,234,394 A | 8/1993 | Wilkinson | |
| 5,255,697 A | 10/1993 | Grauer | |
| 5,280,800 A * | 1/1994 | Pirrallo | 135/67 |
| 5,577,984 A | 11/1996 | Bare | |
| 5,655,235 A | 8/1997 | DeAth | |
| 5,704,682 A * | 1/1998 | Gorayeb et al. | 297/5 |
| 5,800,318 A | 9/1998 | Coviello | |
| 5,921,900 A | 7/1999 | Mankovitz | |
| 5,967,944 A | 10/1999 | Vittone | |
| 6,053,189 A | 4/2000 | Longenecker | |
| 6,263,892 B1 * | 7/2001 | Baker | 135/66 |
| 6,267,711 B1 | 7/2001 | Hinds | |
| 6,302,126 B1 * | 10/2001 | Nava | 135/66 |
| 6,397,868 B1 * | 6/2002 | Smith | A45B 5/00 135/66 |
| 6,413,249 B1 | 7/2002 | Turi | |
| 6,478,719 B2 | 11/2002 | Chen | |
| 6,527,285 B1 * | 3/2003 | Calandro, II | A61H 3/04 280/650 |
| 6,578,594 B1 | 6/2003 | Bowen | |
| 6,742,523 B2 * | 6/2004 | Dubats | A61H 3/008 128/875 |

(Continued)

*Primary Examiner* — Noah Chandler Hawk
(74) *Attorney, Agent, or Firm* — William R. Bachand

(57) ABSTRACT

A system for exercising muscles that move the thigh according to various aspects of the present invention provides a source of resistance, suitably positioned, for the user to use when forcing the thigh to return to its original standing position, for instance, returning the foot to the floor. Such a system may include a base and an exerciser. The exerciser may include a positioner and a compliant surface. The compliant surface may include an elastic support and a foot receiver. The positioner establishes an initial position of the foot receiver.

9 Claims, 6 Drawing Sheets

(56) References Cited

U.S. PATENT DOCUMENTS

| | | |
|---|---|---|
| 6,890,288 B2 | 5/2005 | Bingham |
| 7,001,313 B1 | 2/2006 | Crnkovich |
| 7,150,722 B1 | 12/2006 | Tyrrell |
| 7,314,435 B2 | 1/2008 | Schlosser |
| 7,422,550 B1 | 9/2008 | Pinero |
| 7,445,606 B2 | 11/2008 | Rastegar |
| 7,537,553 B2 | 5/2009 | Mongelluzzo |
| 7,588,043 B1 | 9/2009 | Bais |
| 7,674,210 B2 | 3/2010 | Girardin |
| 7,699,762 B2 | 4/2010 | Turnbull |
| 7,740,566 B2 | 6/2010 | Nativ |
| 7,938,756 B2 | 5/2011 | Rodetsky |
| 8,122,527 B2 * | 2/2012 | Ruttler .................. A47K 11/04 297/182 |
| 8,177,688 B2 | 5/2012 | Burnfield |
| 8,256,442 B2 | 9/2012 | McCarthy |
| 8,720,914 B1 * | 5/2014 | Heath et al. ............ 280/87.021 |
| 8,852,062 B2 | 10/2014 | Dorsay |
| 2012/0138113 A1 * | 6/2012 | Spinabella et al. ............ 135/66 |
| 2013/0157818 A1 | 6/2013 | Lalaoua |
| 2013/0167888 A1 * | 7/2013 | LoSasso ........................ 135/66 |

* cited by examiner

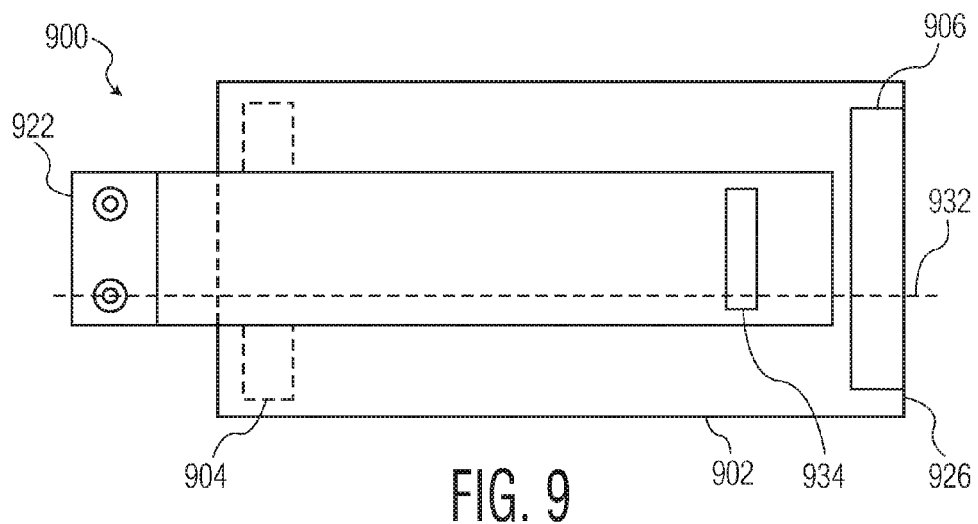
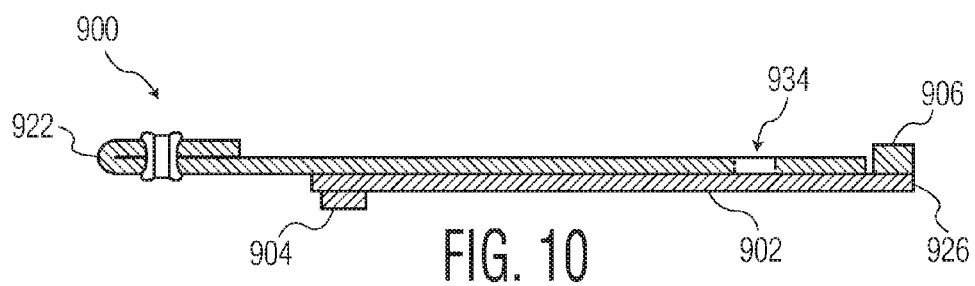
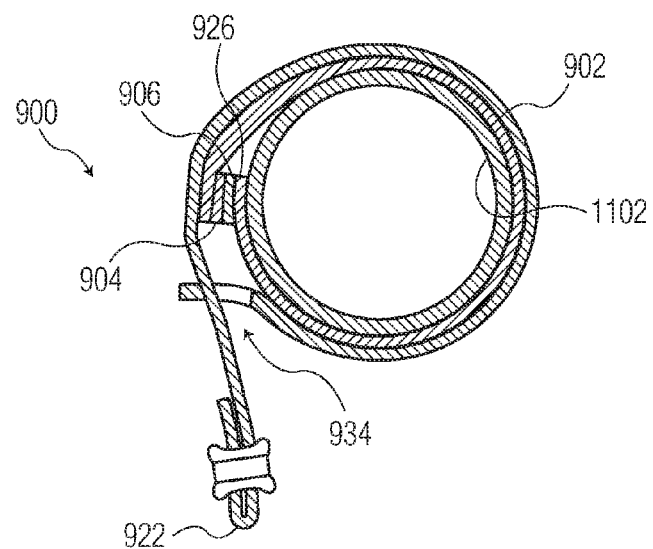

SYSTEMS AND METHODS FOR EXERCISING MUSCLES THAT MOVE THE THIGH

BRIEF DESCRIPTION OF THE DRAWING

Embodiments of the present invention will be described with reference to the drawing, wherein like designations denote like elements, the terms left and right are from the perspective of a user standing behind the system, and:

FIG. 9 is a plan view of a positioner for use in place of the left and right position adjusters in another implementation of the system of FIG. 2;

FIG. 10 is a cross sectional view of the positioner of FIG. 9 along axis 901 of FIG. 9; and FIG. 11 is a cross sectional view of the positioner of FIG. 9 installed around a brace of the system of FIG. 2.

DETAILED DESCRIPTION OF THE PREFERRED EMBODIMENTS

Figure 1:
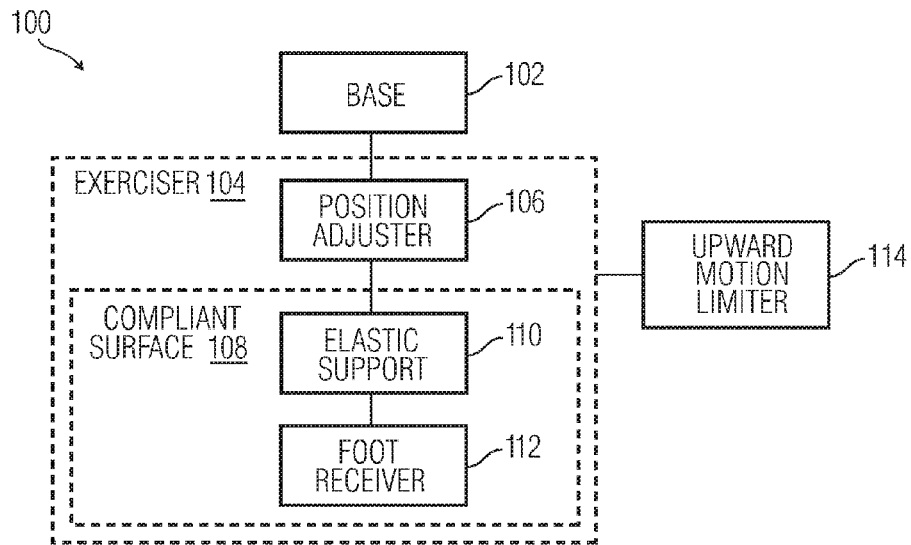
FIG. 1 is a functional block diagram of a system for exercising muscles that move the thigh according to various aspects of the present invention.

Some decline in gait function can occur with deterioration or injury affecting the muscles that move the thigh in human subjects. These muscles contribute to healthy gait function by, for example, lifting the leg in a pivot at the hip. Lifting the leg in this way is fundamental to climbing stairs, walking uphill, and to a lesser extent, walking on a level surface. If thigh movement capability in one leg is less than normal, human subjects may drag that leg. If thigh movement capability in both legs is less than normal, human subjects may be unable to walk.

Muscle exercise contributes to increasing strength and range of motion. For these increases in thigh movement, an exercise can be performed from an initial position where the subject is standing on a floor. The exercise involves lifting the thigh (allowing the knee to bend, and raising the foot off of the floor) and, with the foot against a source of resistance, forcing the thigh to return to its original position (returning the foot to the floor) against the resistance. This exercise contributes to improved gait function by positively affecting the muscles that move the thigh.

There are four groups of muscles that move the thigh: the gluteal muscles, the lateral rotators, the adductors, and iliopsoas muscle. The gluteal muscles cover the lateral surfaces of the ilia. The gluteus maximus muscle is the largest and most posterior of the gluteal muscles. Its origin includes parts of the ilium; the sacrum, coccyx, and associated ligaments; and the lumbodorsal fascia. Acting alone, this massive muscle produces extension and lateral rotation at the hip joint. The gluteus maximus shares an insertion with the tensor fasciae latae muscle, which originates on the iliac crest and the anterior superior iliac spine. Together these muscles pull on the iliotibial tract, a band of collagen fibers that extends along the lateral surface of the thigh and inserts on the tibia. This tract provides a lateral brace for the knee that becomes particularly important when you balance on one foot. The gluteus medius and gluteus minimus muscles originate anterior to the origin of the gluteus maximus muscle and insert on the greater trochanter of the femur. The anterior gluteal line on the lateral surface of the ilium marks the boundary between these muscles.

The lateral rotators originate at or inferior to the horizontal axis of the acetabulum. There are six lateral rotator muscles in all, of which the piriformis muscle and the obturator muscles are dominant.

The adductors originate inferior to the horizontal axis of the acetabulum. This muscle group includes the adductor magnus, adductor brevis, adductor longus, pectineus, and gracilis muscles. All but the adductor magnus originate both anterior and inferior to the joint, so they perform hip flexion as well as adduction. The adductor magnus muscle can produce either adduction and flexion or adduction and extension, depending on the region stimulated. The adductor magnus muscle may also produce medial or lateral rotation at the hip. The other muscles produce medial rotation. These muscles insert on low ridges along the posterior surface of the femur.

Two muscles are powerful hip flexors and are often referred to collectively as the iliopsoas muscle: the psoas major muscle and the iliacus muscle. The medial surface of the pelvis is dominated by this pair of muscles. The large psoas major muscle originates alongside the inferior thoracic and lumbar vertebrae, and its insertion lies on the lesser trochanter of the femur. Before reaching this insertion, its tendon merges with that of the iliacus muscle, which nestles within the iliac fossa.

Performance of the exercise discussed above not only improves muscle strength and range of motion in all of the muscles that move the thigh being lifted, but also improves balance. As the foot is lifted from the floor, the muscles of the opposite leg are called into action to remain standing. If the subject has access to supports to be grasped with the hands, then the musculature of the arms and upper body are called into action as well.

A system for exercising muscles that move the thigh according to various aspects of the present invention provides a source of resistance, suitably positioned, for the subject (also called the user of the system or simply user) to use when forcing the thigh to return to its original standing position (returning the foot to the floor). Such a system may include a base, an exerciser, and an upward motion limiter. The exerciser may include a position adjuster and a compliant surface. The compliant surface may include an elastic support and a foot receiver. The upward motion limiter may be mechanically coupled to any part of the exerciser to protect the user from unintended, perhaps sudden, release of energy, for example, from the elastic support.

A base includes any structure that locates an exerciser for convenient use of the system by the user. A base may provide a reference location for an upward motion limiter. A base may provide mass to reduce movement of the base while the system is in use. A base may have additional functions unrelated to the exerciser (e.g., serve as an appliance, an aid to movement, a source of stability for the user). A base may be part of an immovable structure (e.g., a wall, a door frame). A base may be portable, collapsible, and/or relatively light weight to facilitate movement of the system to a suitable location for exercise and/or to facilitate other functions of the base.

An exerciser includes any source of resistance located and used relative to a base. An exerciser may provide an initial position for initial location of a user's foot at the beginning of use of the system. An exerciser may provide resistance in a manner linear with motion of the thigh. An exerciser may provide resistance in a manner that is nonlinear with motion of the thigh. An exerciser may be subject to upward motion limiting.

An upward motion limiter includes any structure that inhibits upward motion of any portion of an exerciser. Upward motion is defined with reference to a user in standing position before exercise begins. Without limited upward motion, a portion of an exerciser may move above and beyond an initial position of the exerciser to an extent unexpected by the user. By limiting upward motion, a possibility is reduced of injury to the user or to others near the system.

A position adjuster includes any structure that sets and/or adjusts an initial position of a compliant surface before exercise begins. A variety of initial positions can accommodate variations between users in height, flexibility, ability to lift the thigh, balancing capability, and coordination. While assistance from another person (e.g., coach, trainer, physical therapist, nurse) may be sufficient for the user to attain a factory-defined initial position, the system's ability to set and/or adjust an initial position provides a larger market and greater utility for the system.

A compliant surface includes any surface positioned by a position adjuster and onto which a user places a foot for repeat performance of the exercise discussed above. A compliant surface may facilitate movement of at least a portion of the surface to a maximum downward position. A compliant surface may return to an initial position for repeating the performance of the exercise. A compliant surface may return to a position different from the initial position for repeating the performance of many cycles of the exercise. A compliant surface may provide resistance, as discussed above, against the user's downward force applied by the user's foot against the compliant surface. Movement of a compliant surface may be limited by an upward motion limiter.

An elastic support includes any material or assembly for coupling a position adjuster to a foot receiver to position and/or support the foot receiver. An elastic support may lift the thigh during a latter portion of the exercise. An elastic support may return a portion of the compliant surface to an initial position. The form of material may be any conventional form (e.g., sheet, foam, tubing, wound spring) that exhibits elasticity and/or resilience. The manner of operation of material or assembly (e.g., band, spring) may be any conventional manner (e.g., elongation, compression, rotation).

An elastic support may absorb and/or dissipate energy so that the user must provide energy (perform mechanical work) to accomplish the exercise. For example, an elastic support may include a dashpot, a shock absorber, a cylinder of compressible gas such as air, a liquid or gas forced through an orifice, electromagnetic technology for converting work to heat or light, and/or hydraulic technology for converting work to linear or rotational momentum.

A foot receiver accepts the user's foot. A foot receiver may protect the foot from injury (e.g., blunt impact, twist, awkward provision of force, limit upward motion of the foot). A foot receiver may inhibit motion of the foot during exercise (e.g., slippage, bounce). A foot receiver may accept either a right foot or a left foot in a universal receiver or in custom receivers adapted for the shape and mechanical differences between left and right feet.

Systems, according to various aspects of the present invention, including systems 100, 200, and 300 of FIGS. 1-4, comprise the functions discussed above arranged for cooperation. System 100 includes base 102, exerciser 104 and upward motion limiter 114. Base 102 may rest against an immovable surface such as the ground, a floor, a wall, or a massive object such as a vehicle or ship. Base 102 preforms the functions of a base discussed above. Generally, base 102 supports exerciser 104 at a suitable distance away from the immovable surface.

Exerciser 104 is mechanically coupled to base 102. The coupling allows a portion of the exerciser to move in response to the user performing the exercise discussed above. Movement is with respect to base 102.

Upward motion limiter 114 is mechanically coupled to base 102 directly or by means of a portion of exerciser 104. Upward motion limiter 114 inhibits the upward extent of motion of exerciser 104. Upward motion limiter 114 may resist upward motion of exerciser 104 in any conventional manner such as abutting a portion of exerciser 104, applying a restraint to exerciser 104, and/or providing a return force to return exerciser 104 to a position lower than an upward limit position. Upward motion limiter 114 performs the functions of an upward motion limiter discussed above. Upward motion limiter 114 may be integral to base 102.

Exerciser 104 includes position adjuster 106 and compliant surface 108 as an assembly or as an integral unit. Exerciser 104 performs the functions of an exerciser as discussed above.

Position adjuster 106 mechanically couples exerciser 104 to base 102. Position adjuster 106 mechanically couples compliant surface 108 to base 102. Operation by the user of position adjuster 106 sets an initial position of compliant surface 108 with respect to base 102. Generally, operation of the position adjuster is completed before exercise begins. However, exercising may be interrupted to set a new initial position. Initial position may be relative to a surface on which the user is standing. For example, the initial height of compliant surface 108 may be increased after a first set of exercising and before a second set of exercising. The increased height may be suitable after the user has warmed up at a lower height. Position adjuster 106 performs the functions of a position adjuster as discussed above.

Compliant surface 108 is supported (e.g., suspended) by position adjuster 106. During one repetition (e.g., cycle) of exercise, compliant surface 108 may change position with respect to a surface on which the user is standing and then return to the initial position. During a cycle, compliant surface 108 may change shape in one or more dimensions and then return to its original shape. While the operative feature of compliant surface 108 is a surface in contact with the user during exercising, compliant surface 108 may further include any conventional structures for providing resistance, providing support to the user, and/or requiring mechanical work by the user. Compliant surface 108 performs the functions of a compliant surface as discussed above.

Elastic support 110 couples compliant surface 108 to position adjuster 106. Elasticity provides resistance against the user. Elasticity returns compliant surface 108 to the initial position at the end of each cycle. Elastic resistance, or return force, may be a maximum at a position of foot receiver 112 closest to a surface on which the user is standing. Elastic support performs the functions of an elastic support as discussed above.

Foot receiver 112 abuts the user's foot during exercising. Foot receiver 112 and elastic support 110 may be separate or integrated as a unit. Foot receiver 112 may be formed to suitably receive the user's foot naked, wearing a sock, or wearing any conventional footwear. Foot receiver 112 may include a set of surfaces each being appropriate for receiving the user's foot in a different condition or variously clothed. For example, foot receiver 112 may have ridges and/or be porous to drain a naked foot that is wet from swimming or bathing. Foot receiver 112 performs the functions of a foot receiver as discussed above.

Figure 2:
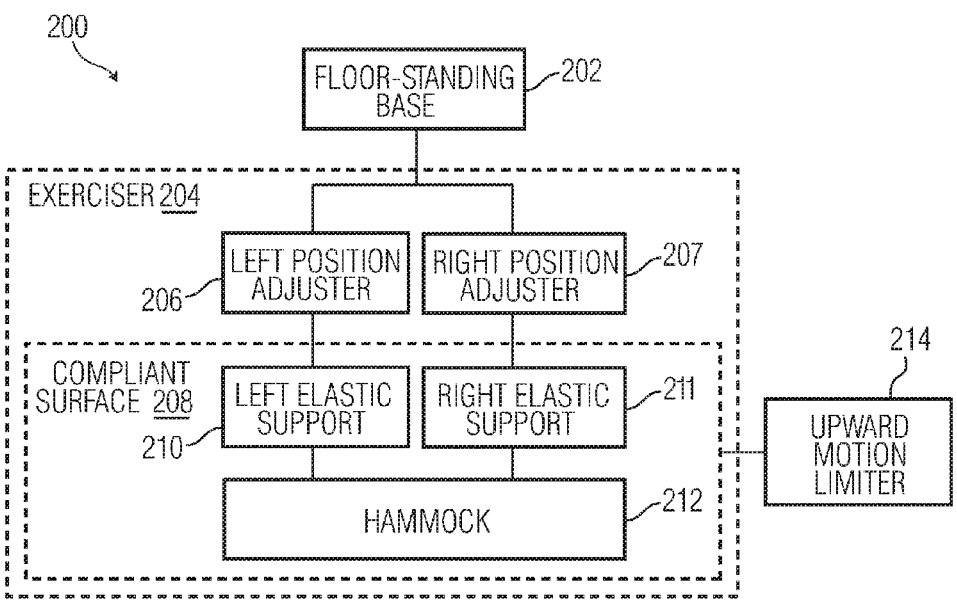
FIG. 2 is a functional block diagram of an implementation of the system of FIG. 1.

System 100 may be implemented as a portable, floor-standing unit. For example, system 200 of FIG. 2 provides the functions and includes the structures as discussed above for a system for exercising muscles that move the thigh. System 200 includes floor-standing base 202, exerciser 204, and upward motion limiter 214. Base 202 provides stability to the user during and after exercise by providing structure onto which the user may place a portion of the user's weight. By placing weight onto base 202, the user may maintain balance, maintain suitable range of motion with respect to exerciser 204, and/or rest between cycles of exercise. Base 202 may be symmetric, having similar or identical structures. For example, base 202 may include a left structure or left side and a right structure or right side with respect to a central vertical plane. Symmetry facilitates use of system 200 by the left leg or the right leg of the user.

Exerciser 204 performs the functions discussed above with reference to an exerciser and to exerciser 104. In the implementation in system 200, exerciser 204 includes left position adjuster 206, right position adjuster 207, and compliant surface 208. Left and right position adjusters have identical functions. Left position adjuster 206 couples compliant surface 208 to a left structure or a left side of base 202. Right position adjuster 207 couples compliant surface 208 to a right structure or a right side of base 202. Left and right position adjusters 206 and 207 perform the functions of a position adjuster as discussed above with reference to a position adjuster and position adjuster 106. By dividing the position adjusting function in two, alternate materials may be used due to the division and distribution of force needed to support a compliant surface in system 200.

Upward motion limiter 214 restricts the upward motion of compliant surface 208.

Compliant surface 208 includes left elastic support 210, right elastic support 211, and hammock 212. Left and right elastic supports 210 and 211 suspend hammock 212, being mechanically coupled to hammock 212 at opposing ends or edges of hammock 212. By dividing the elastic support function in two, alternate materials may be used due to the division and distribution of force needed to suspend hammock 212 in system 200.

Hammock 212 performs the functions of a foot receiver and foot receiver 112 as discussed above. Hammock 212 includes a first surface and a second surface which may be similar or different. Surfaces of hammock 212 may be arranged so that one surface faces upward to abut the user's foot. The user may select which surface is suitable for exercising. In one implementation, the first surface is adapted to abut the sole of a shoe worn by the user and the second surface is adapted to abut the user's naked foot. Conventional technologies for preventing slippage, preventing wear, and providing adequate support on either or both surfaces may be used. For example, hammock 212 may include strips of solid material that interlock when force is applied perpendicular to the first surface (accommodating a shoe) and do not interlock when force is applied perpendicular to the second surface (the reverse surface wraps about a naked foot).

In an implementation where elastic support is provided by separable structure, the user may select and install a desired elastic support for example to exercise against a preferred resistance. In system 200, left elastic support 210 and right elastic support 211 may provide identical resistance to maintain symmetric operation of system 200 and to urge hammock 212 and the user's foot to follow a generally vertical cycle during exercising.

By installing a left elastic support 210 that differs in elasticity from an installed right elastic support, an asymmetric exercise may be accomplished. System 200 may accommodate vertical exercise cycles where the user provides only a vertical force. System 200 may accommodate other exercise cycles where the user provides, in addition to vertical force, horizontal force. The horizontal force may be applied at any height or through any range of heights relative to the surface on which the user is standing.

Compliant surface 208 resists movement of the user's foot in any generally downward direction. Movement may include vertical and horizontal vectors. Consequently, compliant surface 208 may exert resistance with vertical and horizontal vectors. Vertical and horizontal vectors may be symmetric or asymmetric as discussed above with reference to elasticity of left elastic support 210 and right elastic support 211 and/or to exercise more or less different muscles that move the thigh.

System 200 may be implemented in a form resembling a conventional walker. For example, system 300 of FIG. 3 includes conventional walker 380, supported on floor 382. System 300 further includes subsystem 320 removably installed on walker 380. Subsystem 320 may be provided as an aftermarket accessory to a conventional walker. Subsystem 320 may be user-installed without tools.

Walker 380 serves as a base and integral upward motion limiter as discussed above. Walker 380 is a rigid assembly of members joined by conventional technology (e.g., welded, cast, fixed together with adhesive) and includes front upper bar 301, front lower bar 302, left side 303, right side 304. Each side includes a unitary member that serves as a front leg, a rear leg, and a handle 309, 310 therebetween. Each leg includes a terminal 305-308. Left side 303 further includes upper brace 311 and lower brace 313 as structural members. Right side 304 further includes upper brace 312 and lower brace 314 as structural members. Left side 303 and right side 304 are symmetric, having identical dimensions so that terminals 305-308 are in a horizontal plane that matches a horizontal plane of floor 382. Consequently, the height of upper brace 311 matches the height of upper brace 312 relative to floor 382; and the height of lower brace 313 matches the height of lower brace 314 relative to floor 382. As a result, subsystem 320 is supported on walker 380 symmetrically about a vertical plane, perpendicular to floor 382, passing through central point 350, and bisecting front upper bar 301.

Subsystem 320 is an implementation of an exerciser as discussed above with reference to exerciser 204. In this implementation, subsystem 320 includes left panel 321, right panel 322, rings 327-330, bands 331-334, and hammock 345.

A panel preforms the functions of a position adjuster as discussed above. Left panel 321 is identical in dimensions and relation to upper brace 311 to right panel 322 and upper brace 312. Panels 321-322 may be made of industrial fabric or sheet for retention of dimensions under strain. Any conventional fabric may be used including woven mesh industrial textile comprising fibers of nylon, polypropylene, polyester, polyamide, polyethylene, aramids, and/or thermoplastics. Sheet may include any materials listed above and further include fibers for dimensional stability. Panels 321-322 are perforated for accepting rings and bands. Perforations may be reinforced, for example with grommets.

A portion of each panel 321-322 is wrapped over an upper brace 311-312 to establish a length of the panel extending downward from the upper brace toward a lower brace 313-314. When a suitable length is established, rings are passed through perforations to fix the length. Due to wrapping, a first edge 324 of a mounting end of right panel 322 is fixed a first distance from a second edge 326 of a supporting end of right panel 322; and a first edge (not shown) of a mounting end of left panel 321 is fixed a second distance from a second edge 325 of a supporting end of left panel 321.

Rings 327-330 maintain the first distance and the second distance as discussed above. Rings open and close without tools. Rings and perforations may be replaced with quarter turn fastener components that are fixed (e.g., bound, riveted, adhered, swaged) to each panel such as twist-lock Common Sense® fasteners marketed by Scovill Fasteners, Inc. Rings and perforations may be replaced with hook and loop material that is fixed (e.g., sewn, adhered) to each panel such as Velcro® strips marketed by Velcro Industries, B.V. Rings, fasteners, and/or hook and loop material may be located along the vertical edges and/or along a central axis of each panel 321-322.

Assuming identical dimensions of panels 321-322, for symmetrically locating and positioning hammock 345, the first distance and second distance discussed above are substantially equal. According to various aspects of the present invention, panels 321-322 facilitate positioning hammock 345 (e.g., central point 350) a desired height above floor 382 in a manner that is substantially independent of the resistance provided by bands 331-334.

The first distance and the second distance may differ to accommodate a variety of bands, a variety of initial positions of hammock 345, and/or a variety of exercises for different muscles that move the thigh.

Each panel 321-322, at its supporting end mechanically couples to one or more bands (two shown for each panel for clarity of the drawing) at the band's respective panel end. A user may attach one or more bands to each panel for a desired exercise. Bands of different length coupled to the same panel facilitate nonlinear resistance as a function of height of central point 350 of hammock 345 from floor 382. Coupling may be implemented with reinforced perforations suitable for retaining panel ends. Coupling may be implemented with fabric (e.g., a hook and loop strip) to reduce the risk of injury to the user should a coupling fail during exercise.

Each band 331-334 performs the functions of an elastic support as discussed above. Each band contributes to supporting hammock 345. Bands may be identical in length, construction, and resistance. Bands may vary in resistance with identical length (e.g., variation of elastic materials, variation of tubing wall thickness, variation of solid diameter and/or cross sectional shape). Bands 331-334 may exhibit an elastic property substantially via lengthwise elongation. Bands 331-334 may be formed of natural or synthetic elastomeric material of homogeneous, fused, blended, or combined constitution (e.g., rubber, elastomers, one or more elastic polymers, latex, polyvinyl, polyisoprene, elastoesters). Bands 331-334 may be formed of a carrier material and fibers integrated, as a core, and/or as a covering. Fibers may be woven, co-linear, and/or wound.

Each band may include a mechanical fastener at each of the two ends of the band. Mechanical fasteners may be integral (e.g., molded, cured) to the band. Mechanical fasteners may be joined as a terminal of each band's end. Conventional mechanical fasteners may be used (e.g., hooks, hooks with closures, rings, spirals, tees, resilient cones, resilient knobs, snaps, ties). A band may be terminated with a loop (e.g., integral, comprising fibers of a core or a cover) for attaching to a perforation of a panel or hammock using a knot (e.g., a larks head). Each perforation of a panel is reinforced with a circular or oval grommet and accepts a hook terminal of a band 331-334. Ovals may be oriented on a diagonal to inhibit unintended release of the mechanical coupling. Perforations may be omitted and any conventional mechanical coupling may be used instead.

Lower braces 313-314 guide bands 331-334 toward hammock 345 for several purposes. A lower brace abuts a band to increase the length between the supporting end (325) of a panel (321) and hammock 345. A lower brace abuts a band to limit upward motion of the band and/or the hammock. In system 300, upward motion is limited by cooperation of the lower brace and the band. For example, upward motion of central point 350 will eventually stretch each band 331-334 so that elastic resistance of each band decelerates and stops upward motion.

In an extreme case, for instance, the user's foot may slip off of hammock 345 when hammock 345 is near or touching floor 382, with bands 331-334 at a maximum extended length. A maximum elastic return force may propel hammock 345 and bands 331-334 toward the user's face. Lower braces 313-314 in cooperation with bands 331-334 limit the upward motion of hammock 345 to reduce the possibility that hammock 345 can touch the user's face with sufficient blunt impact to cause injury.

A hammock performs the functions of a foot receiver as discussed above. Hammock 345 includes perforations 346-349 for mechanically coupling bands 331-334 to hammock 345. Each perforation 346-349 is reinforced with a circular or oval grommet and accepts a hook terminal of a band 331-334. Ovals may be oriented on a diagonal to inhibit unintended release of the mechanical coupling. Perforations may be omitted and any conventional mechanical coupling may be used instead, for example, of the type discussed above for coupling a band to a panel. Hammock 345 may be formed of any industrial textile or sheet, for example, of the type discussed above for a panel. Hammock 345 may have substantially fixed dimensions.

In another implementation, hammock 345 is somewhat elastic and performs some of the functions of an elastic support as discussed above.

A subsystem 320 may comprise a kit of components, for example, including panels 321-322, rings 327-330, bands 331-334, and a hammock 345 as discussed above. In another implementation, a subsystem may comprise an assembly. For example, subsystem 400 of FIG. 4 may be used in system 300, replacing subsystem 320. Subsystem 400 is an assembly comprising left panel portion 402, joined to elastic receiver portion 403, joined to right panel portion 404. Joining at junction 432 between portions 402-403 and at junction 434 between portions 403-404 may be accomplished with any conventional fabric joining technology (e.g., sewn, adhered, bonded, fused). Portions 402 and 404 are formed of substantially inelastic material (as discussed above with reference to panel 321), while portion 403 is formed of substantially elastic material (as discussed above with reference to band 331 and/or hammock 345).

In operation, portion 402 (404) serves as a position adjuster as discussed above. Each portion 402 (404) wraps around an upper brace 311 (312) for instance about an axis 406 (408). Mechanical coupling component 420 (421) is fastened by the user to any of a series of mating coupling components 422 (423). Portion 404 is used in an analogous manner. Together portions 402 and 404 establish an initial position of central point 440 at a suitable height from surface 382.

Elastic receiver portion 403 performs the functions of elastic supports and a foot receiver, as discussed above. Elastic receiver portion 403 passes under lower braces 313-314 to be subject to upward motion limiting as discussed above.

In an implementation of subsystem 400, adjustment of position by operation of portions 402 and 404 may affect both the position of central point 440 and the resistance provided by elastic receiver portion 403. For instance, portion 403 may be stretched from a relaxed position to establish an initial position before exercise begins.

To avoid difficulty in establishing a suitable initial position and a suitable resistance, more than one subassembly 400 may be simultaneously installed on walker 301. For instance, two subassemblies of different dimensions may be used to introduce resistance that is a nonlinear function of distance of central point 440 from floor 382.

Figure 5:
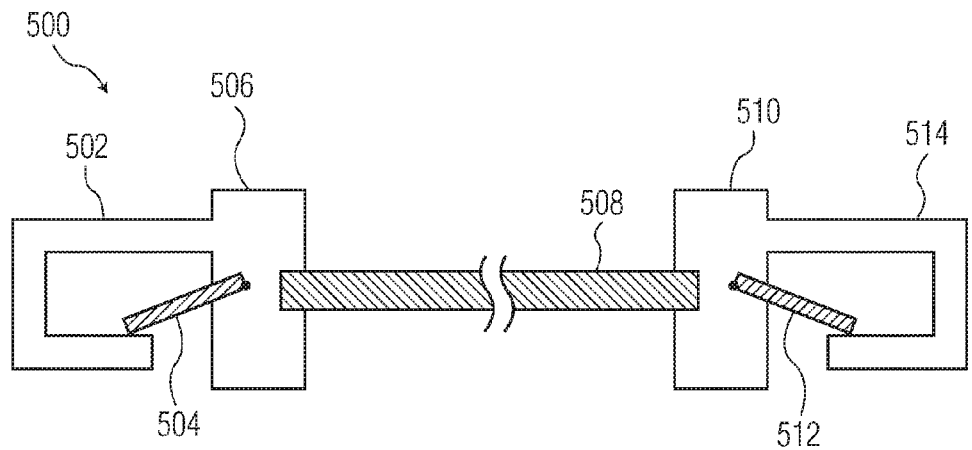
FIG. 5 is a cross section of a cordon for use with the systems of FIGS. 3 and 4.

To reduce the risk of injury to a person attempting to sit on an exerciser, a cordon may be suspended over the exerciser. Operation of exerciser 320 or 400 may require installation of a cordon. For example, cordon 500 of FIG. 5 includes terminals 506 and 510 at opposite ends of cord 508. Conventional materials and technologies may be used to attach suitable terminals and cord. In operation, terminal 506 may mount to pair of perforations 362 of FIG. 3 and terminal 510 may mount to pair of perforations 364. Consequently, cord 508 extends above hammock 345 and serves as notice not to sit on hammock 345.

In another implementation, twisting about a central axis (414 of elastic receiver 403) or analogous twisting of hammock 345 may be permissible. Cordon 500 may cooperate with left panel portion 402 (and analogously portion 404) to adjust the initial position of central point 440 over surface 382. In such an implementation, mechanical couplings 422 and 423 are omitted. Terminal 506 includes hook 502 and pivoting closure 504 that fix pair of perforations 462 in alignment with a selected pair of perforations of series 466. In an analogous manner, terminal 510 includes hook 514 and pivoting closure 510 that fix the selected operation of right panel portion 404. In this configuration, hooks 502 and 514 serve as mechanical couplings that set the adjusted position of central point 440 and may set the initial resistance provided by elastic receiver portion 403. Cordon 500 serves as notice not to sit on exerciser 400. Cordon 500 also serves (by its mass) to inhibit upward motion of elastic receiver portion 403. Due to cordon 500 serving as mechanical couplings of position adjusters, subsystem 400 cannot be used without cordon 500.

A positioner, according to various aspects of the present invention, includes any structure that establishes an initial position of a compliant surface of an exerciser. A positioner may support the compliant surface throughout the user's operation of the exerciser. In one implementation, an upward motion limiter may cooperate with a positioner, in a manner analogous to the cooperation with position adjuster, discussed above. In another implementation of an exerciser with one or more positioners, the upward motion limiter is omitted.

For example, a system according to various aspects of the present invention, comprises system 100 of FIG. 1 without position adjuster 106 and instead includes a positioner (not shown) in its place. The positioner mechanically couples compliant surface 108 to base 102. In operation, compliant surface 108 is initially positioned for use by the exerciser. The adjusting capability discussed above with reference to position adjuster 106 is omitted.

In another example, a system according to various aspects of the present invention, comprises system 200 of FIG. 2 without left position adjuster 206 and without right position adjuster 207; and instead includes a left positioner (not shown) and a right positioner (not shown). Each positioner mechanically couples compliant surface 208 to floor-standing base 202. In operation, compliant surface 208 is initially positioned for use by the exerciser. The adjusting capability discussed above with reference to left position adjuster 206 and right position adjuster 207 is omitted.

Figure 3:
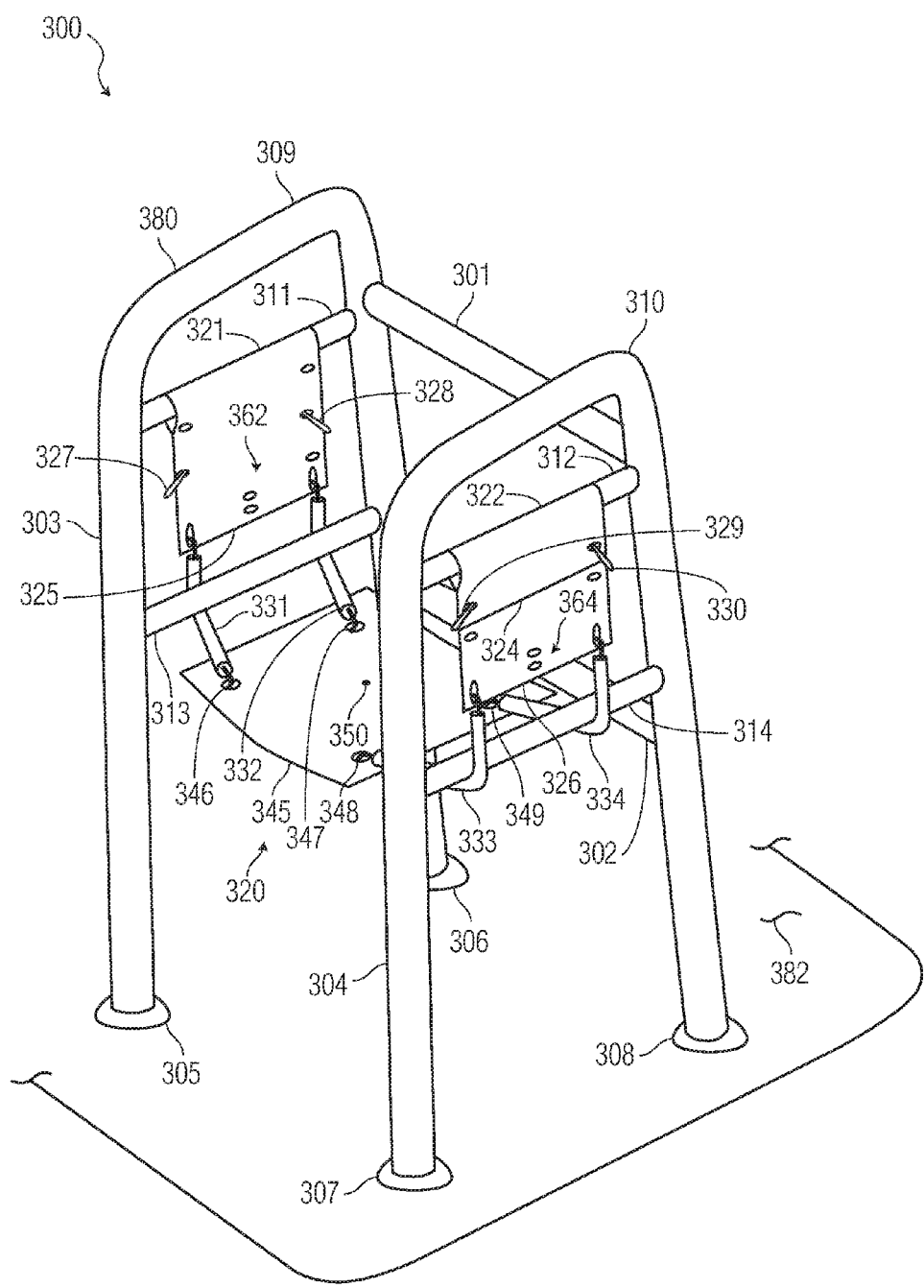
FIG. 3 is a perspective plan view of an implementation of the system of FIG. 2 involving a conventional walker.
Figure 4:
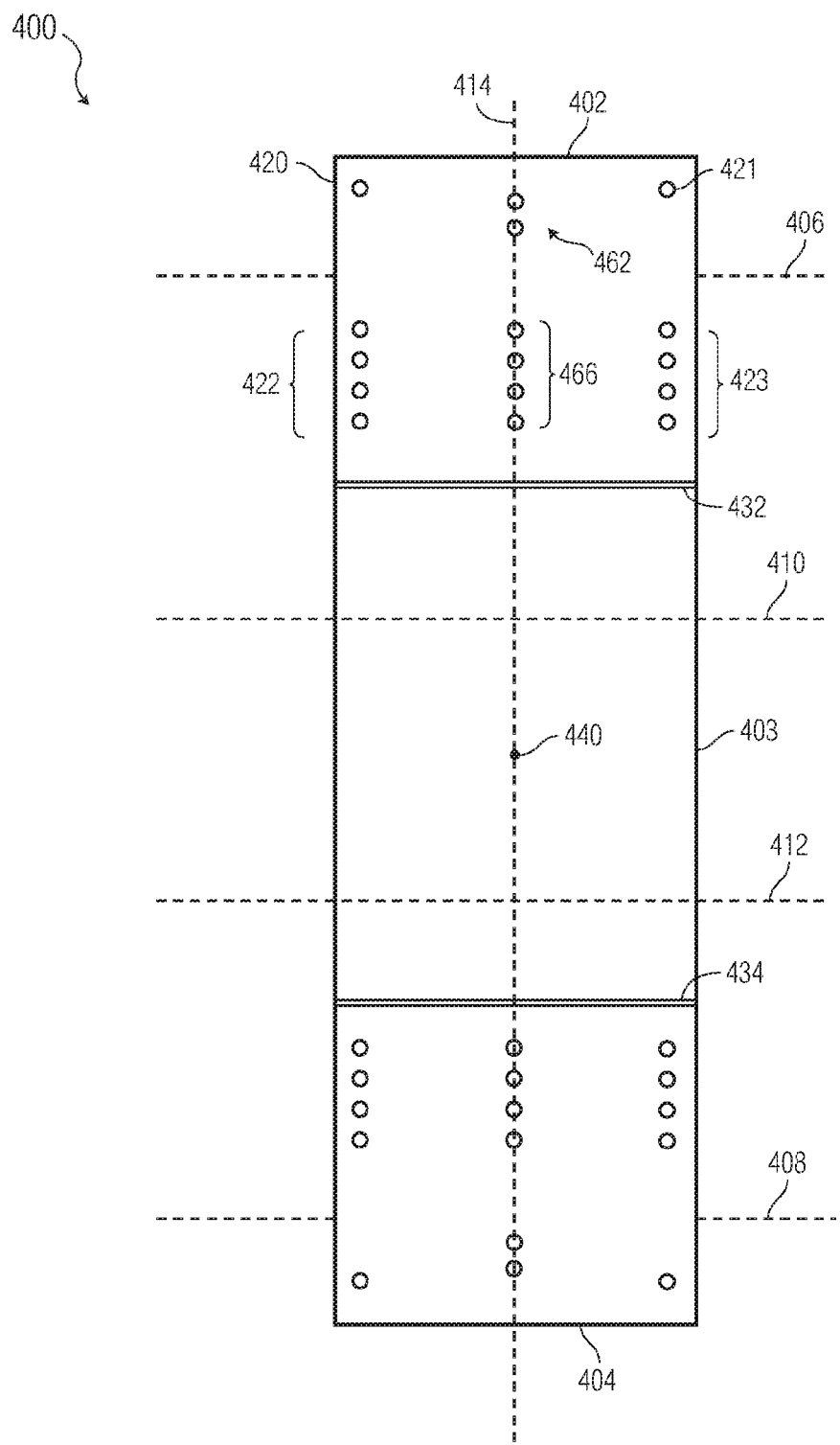
FIG. 4 is a plan view of an exerciser for use in an alternate implementation of the system of FIG. 2 involving a conventional walker.

In another example, a system according to various aspects of the present invention, comprises system 300 of FIG. 3 without left panel 321 and without right panel 322; and instead includes a left positioner (not shown) and a right positioner (not shown). The left positioner mechanically couples bands 331 and 332 to walker 380. The right positioner (identical in structure and function to the left positioner) couples bands 333 and 334 to walker 380. In operation, hammock 350 is initially positioned for use by the exerciser. The adjusting capability discussed above with reference to left panel 321 and right panel 322 is omitted.

A positioner may be constructed of a tape of fabric (e.g., belt, strap) comprising a first end for mechanically coupling the positioner to bands and/or a hammock; and comprising a second end for mechanically coupling the positioner to a walker. The second end may comprise a retainer that retains the tape around a portion of the walker. The retainer may comprise a slot in the tape, a loop, and/or a buckle mounted to the tape that in operation permits passage of the first end through the tape, loop, and/or buckle so that the tape remains wrapped around a portion of the walker.

Figure 6:
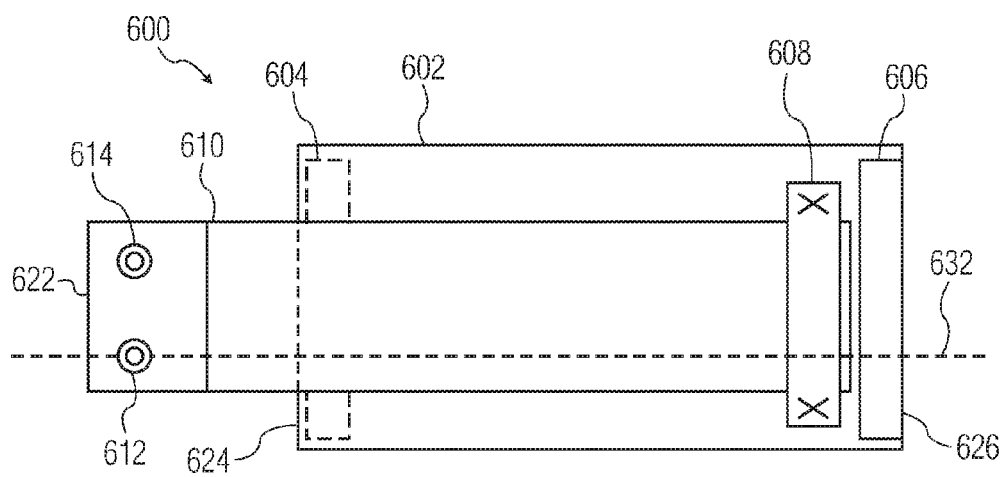
FIG. 6 is a plan view of a positioner for use in place of the left and right position adjusters in another implementation of the system of FIG. 2.
Figure 7:
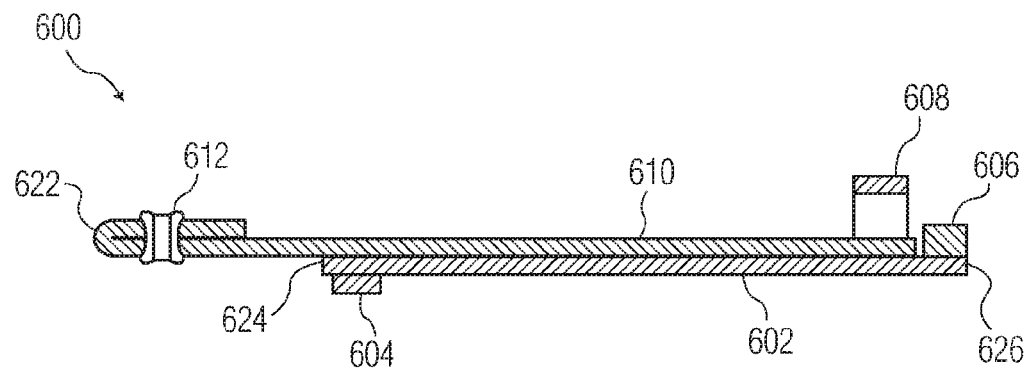
FIG. 7 is a cross sectional view of the positioner of FIG. 6 along axis 632 of FIG. 6.

For example, positioner 600 of FIGS. 6 and 7 includes a tape comprising wrap 602, belt 610, and retainer 608, each fabricated of flexible material (e.g., woven nylon strap of the type used for conventional automobile seat belts, synthetic fabric of the type used for conventional trampolines or vehicle pull straps). Belt 610 and retainer 608 are attached to wrap 602 in any conventional manner (e.g., sewn, glued, riveted, bonded). Wrap 602 includes hooked fabric 604 at second end 624 of wrap 602 and includes looped fabric 606 at first end 626 of wrap 602. Fabrics 604 and 606 are of the type used to form conventional hook and loop fasteners. Retainer 608 is mounted to wrap 602 close to end 626. A portion of belt 610 near end 622 of belt 610 extends away from wrap 602, beyond second end 624. Belt 610 includes grommets 612 and 614. Each grommet is for mechanically coupling a band (e.g., bands 331-334) to positioner 600.

Figure 8:
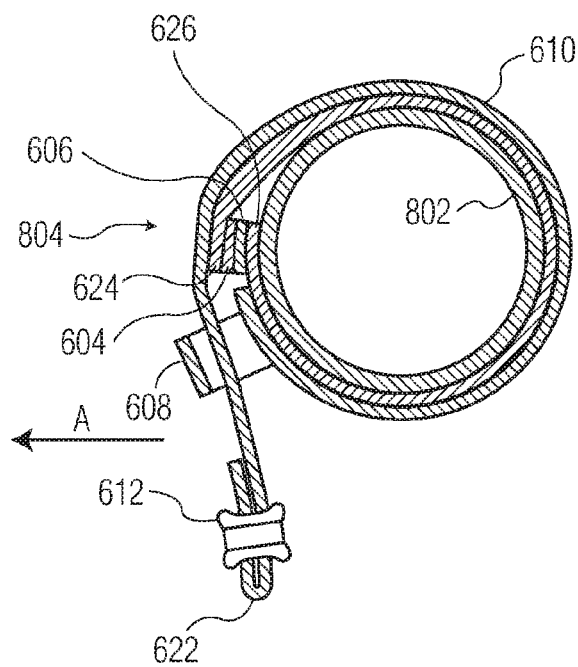
FIG. 8 is a cross view of the positioner of FIG. 6 installed around a brace of the system of FIG. 2.

To install positioner 600 around a tube of a floor-standing base, first end 626 is placed against the tube, the tape comprising wrap 602 is wrapped around the tube, fabric 604 is pressed into fabric 606 and finally end 622 is passed under retainer 608. A complete installation is shown in FIG. 8.

To install positioner 900 of FIGS. 9-11 around a tube 1102 of a floor-standing base, first end 926 is placed against the tube 1102, the tape comprising wrap 902 is wrapped around the tube, fabric 904 is pressed into fabric 906 and finally end 922 is passed through slot 934. A complete installation is shown in FIG. 11.

Two identical positioners may be installed on opposing portions of a floor-standing base to accomplish positioning an exerciser as discussed above. For example, positioner 600 of FIG. 8 is shown installed on tube 802 of a floor-standing base. Tube 802 may correspond to a brace of a walker 300 as discussed above. For example, when positioners of the type described with reference to positioner 600 are installed on upper braces 311 and 312, bands 331-334 cooperate with lower braces 313 and 314 for upward motion limiting as discussed above. As another example, when positioners of the type described with reference to positioner 600 are installed on lower braces 313 and 314, the function of upward motion limiting is omitted.

According to various aspects of the present invention, a retainer and a hook and loop fastener cooperate to maintain the coupling of a positioner to a walker. Retainer 608 transfers a force in direction A of FIG. 8 into longitudinal force along axis 632. Hook and loop fastener 804, comprised of nested fabrics 604 and 606, also bears some of this longitudinal force to maintain the coupling of positioner 600 around tube 802. Retainer 608 further maintains the effectiveness of fastener 804 by inhibiting separation of fabrics 604 and 606 which would occur if movement of end 622 in response to a force in direction A was not limited by retainer 608. Without retainer 608, all longitudinal force in direction A would be born by fastener 804 and the attachment of fabrics 604 and 606 to wrap 602. Without fastener 804, all longitudinal force in direction A would be born by retainer 622 and the attachment of retainer 622 to wrap 602.

The foregoing description discusses preferred embodiments of the present invention, which may be changed or modified without departing from the scope of the present invention as defined in the claims. As used herein, the term 'coupled' is used for explaining cooperation (e.g., electrical communication, mechanical communication) that may be direct or indirect (e.g., through intervening mechanical, through intervening electrical components). As used herein, the term 'generally' is used for explaining a component or process in an implementation where in other implementations of the present invention each of the progressively narrower terms 'substantially', 'primarily', and 'exclusively' is specifically intended to be disclosed and to apply. These relationships correspond to relative effectiveness of the component or process such as generally about 50% effective, substantially about 80% effective, primarily about 95% effective, and exclusively meaning 100% effective. The term 'about' means a factor of +/−15%. The examples listed in parentheses may be alternative or combined in any manner. The invention includes any practical combination of the structures and methods disclosed. As used in the specification and claims, the words 'having' and 'including' in all grammatical variants are open-ended and synonymous with 'comprising' and its grammatical variants. While for the sake of clarity of description several specifics embodiments of the invention have been described, the scope of the invention is intended to be measured by the claims as set forth below.

What is claimed is:

1. A kit for adding standing exercise capability for a human user to a walker supported on a surface, the walker having a left side and a right side, the kit comprising:

a. a left positioner and a right positioner, at least one positioner respectively comprising
      (1) a tape that includes a first mechanical coupler;
      (2) a first hook and loop fastener coupled to the tape;
      (3) a second hook and loop fastener coupled to the tape, the second hook and loop fastener configured to nest with the first hook and loop fastener when a first portion of the tape is wrapped around at least a respective portion of the walker; and
      (4) a retainer; wherein
      (5) the retainer is coupled to the tape between the first hook and loop fastener and the second hook and loop fastener before the tape is wrapped around the respective portion of the walker; and
      (6) the retainer is configured to allow passage of a second portion of the tape through the retainer to inhibit separation of the first hook and loop fastener and the second hook and loop fastener after the first portion of the tape is wrapped around the respective portion of the walker;
   b. a hammock that includes at least one second mechanical coupler, the hammock adapted for receiving a foot of the user to facilitate use of the hammock in a standing exercise by the user to improve the gait of the user; and
   c. a left band and a right band, at least one band comprising a third mechanical coupler, a fourth mechanical coupler, and lengthwise extendable resilient material between the third and fourth mechanical couplers, each band adapted for performing the standing exercise to improve gait of the human user, the at least one band
      (1) adapted for coupling without tools to the second portion of the tape via cooperation of the first mechanical coupler and the third mechanical coupler; and
      (2) adapted for coupling without tools to the hammock via cooperation of the second mechanical coupler and the fourth mechanical coupler;
   d. wherein the at least one positioner, the hammock, the left band, and the right band are adapted for repetitive applications of a substantial portion of the user's weight to accomplish the standing exercise.

2. The kit of claim 1 wherein the retainer comprises a loop that allows passage of the second portion of the tape through the loop.

3. The kit of claim 1 wherein the retainer comprises a buckle that allows passage of the second portion of the tape through the buckle.

4. The kit of claim 1 wherein the retainer comprises a slot in the tape that allows passage of the second portion of the tape through the slot.

5. The kit of claim 1 wherein the retainer is located on the tape to further nest the first hook and loop fastener and the second hook and loop fastener in response to a force of abutting the tape against the retainer.

6. The kit of claim 1 wherein the first mechanical coupler comprises a reinforced perforation through the tape.

7. The kit of claim 1 wherein the second mechanical coupler comprises a reinforced perforation through the hammock.

8. The kit of claim 1 wherein the third mechanical coupler comprises a hook.

9. The kit of claim 1 wherein the fourth mechanical coupler comprises a hook.

* * * * *